United States Patent
Miyata

(10) Patent No.: US 12,215,217 B2
(45) Date of Patent: Feb. 4, 2025

(54) COMPOSITION FOR ACOUSTIC MEMBER AND ACOUSTIC MEMBER

(71) Applicant: Yamaha Corporation, Shizuoka (JP)

(72) Inventor: Tomoya Miyata, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 545 days.

(21) Appl. No.: 17/569,449

(22) Filed: Jan. 5, 2022

(65) Prior Publication Data

US 2022/0127442 A1  Apr. 28, 2022

Related U.S. Application Data

(63) Continuation of application No. PCT/JP2019/037801, filed on Sep. 26, 2019.

(30) Foreign Application Priority Data

Jul. 8, 2019  (JP) .................. 2019-127198

(51) Int. Cl.
 *C08L 23/22* (2006.01)
 *H04R 1/02* (2006.01)
 *C08K 3/013* (2018.01)

(52) U.S. Cl.
 CPC .............. *C08L 23/22* (2013.01); *H04R 1/02* (2013.01); *C08K 3/013* (2018.01); *H04R 2201/029* (2013.01)

(58) Field of Classification Search
 CPC .......... C08L 23/22; C08L 23/20; H04R 1/02; H04R 2201/029; C08K 3/013; C08K 5/0025; C08K 3/04
 See application file for complete search history.

(56) References Cited

U.S. PATENT DOCUMENTS

| | | | | |
|---|---|---|---|---|
| 2013/0266173 A1* | 10/2013 | Niedermann | .......... | H04R 9/025 381/400 |
| 2014/0376761 A1* | 12/2014 | Godfrey | ................. | H04R 1/086 381/355 |
| 2018/0186980 A1 | 7/2018 | Negami | | |

FOREIGN PATENT DOCUMENTS

| | | |
|---|---|---|
| CN | 107709449 A | 2/2018 |
| JP | H05-168090 A | 7/1993 |
| JP | 2001-064461 A | 3/2001 |
| JP | 2007-169321 A | 7/2007 |
| JP | 2007-214840 A | 8/2007 |
| JP | 2010144142 A * | 7/2010 |
| JP | 2018-177853 A | 11/2018 |
| WO | 2017018426 A1 | 2/2017 |

OTHER PUBLICATIONS

Machine translation of JP 2010 144142 (Year: 2010).*
International Search Report in PCT/JP2019/037801, dated Nov. 12, 2019.

(Continued)

*Primary Examiner* — Doris L Lee
(74) *Attorney, Agent, or Firm* — Global IP Counselors, LLP

(57) ABSTRACT

A composition for an acoustic member includes a non-diene butyl rubber, and a liquid polymer having a molecular weight of 1,000 to 120,000. A difference in an SP value between the liquid polymer and the butyl rubber is within ±0.5.

9 Claims, 2 Drawing Sheets

(56) References Cited

OTHER PUBLICATIONS

The Second Office Action in the corresponding Chinese Patent Application No. 201980098090.3, dated Jan. 31, 2024.
Notice of Reasons for Refusal in the corresponding Japanese Patent Application No. 2021-530475, dated October 3, 2022.
Notice of First Examination Opinion in the corresponding Chinese Patent Application No. 201980098090.3, dated Sep. 5, 2023.
The Second Office Action in the corresponding Chinese Patent Application No. 201980098090.3, dated Jun. 27, 2024.

\* cited by examiner

//COMPOSITION FOR ACOUSTIC MEMBER AND ACOUSTIC MEMBER

CROSS-REFERENCE TO RELATED APPLICATIONS

This application is a continuation application of International Application No. PCT/JP2019/037801, filed on Sep. 21, 2019, which claims priority to Japanese Patent Application No. 2019-127198 filed in Japan on Jul. 8, 2019. The entire disclosures of International Application No. PCT/JP2019/037801 and Japanese Patent Application No. 2019-127198 are hereby incorporated herein by reference.

BACKGROUND

Technological Field

The present invention relates to a composition for manufacturing acoustic members, such as a speaker edge or an insulator for a handheld microphone, and to an acoustic member that uses said composition.

Background Information

Various types of rubber elastic materials are used for members that absorb the excess vibration of a diaphragm, thereby improving the quality of the generated sound, such as an edge member that supports the outer peripheral end of the diaphragm of a speaker (referred to as a speaker edge). In addition, similar rubber elastic materials are used for insulators that cut handling noise from the grip portion and that enhance the sound collecting performance of the microphone capsule included in a handheld microphone, or the like.

These elastic materials are required to have a moderately high internal loss, as well as flexibility, and durability.

For example, Japanese Laid-Open Patent Publication No. H5-168090 discloses a free edge material of a speaker that includes prescribed amounts of a thermoplastic resin having good vibration absorption and a crosslinked rubber having good vibration absorption, and in which rubber in the form of particles is uniformly dispersed inside the thermoplastic resin. In the embodiment, polypropylene and brominated butyl rubber are kneaded, resin vulcanizer as a crosslinking agent and low-molecular-weight polybutene as a softening agent are added thereto to thereby prepare a material, and the molded product is said to be not hard like plastic but rather flexible and elastic like crosslinked rubber.

A method in which process oil is blended with rubber to soften the rubber is also known.

SUMMARY

The material disclosed in Japanese Laid-Open Patent Publication No. H5-168090 seems to have achieved a certain degree of flexibility and elasticity, but in terms of a specific evaluation, the hardness of the free edge made from this material is only 65 (JIS A). It is said therein that by using a material having good vibration absorption, a free edge having the same or higher level than that of the conventional free edge can be obtained, but the vibration absorption performance is unknown.

In addition, components such as the process oil remain liquid even after crosslinking, which leads to the problem that bleed-out tends to occur.

Although attempts have been made to modify rubber compositions in this manner to thereby provide a material suitable for use in acoustic members, a material that is satisfactory in terms of sound quality has yet to be provided.

Therefore, an object of the present invention is to provide a composition for an acoustic member that is suitable as an acoustic member, which secures flexibility and a moderately high internal loss, has excellent durability in which bleed-out of the internal additive, etc., does not occur, and that can maintain design hardness, and an acoustic member with excellent sound quality using said composition.

According to one aspect of the present invention, a composition for an acoustic member is provided, composed of a non-diene butyl rubber and a liquid polymer having a molecular weight of 1,000 to 120,000, wherein the difference in the SP values of the liquid polymer and of the butyl rubber is within ±0.5.

In addition, according to another aspect of the present invention, a composition for an acoustic member is provided, composed of a non-diene butyl rubber and a liquid polymer, wherein the internal loss (tan δ) in a dynamic viscoelasticity measurement of a first crosslinked product of said composition, when measured under the conditions of 20° C., 0.1% dynamic strain, and 1 Hz frequency, is increased by 120% or more as compared with a second crosslinked product formed by removing the liquid polymer from said composition, and the A hardness of the first crosslinked product according to JIS K6253 is 60% or more and 90% or less of the A hardness of the second crosslinked product.

DETAILED DESCRIPTION OF THE EMBODIMENTS

Figure 1:
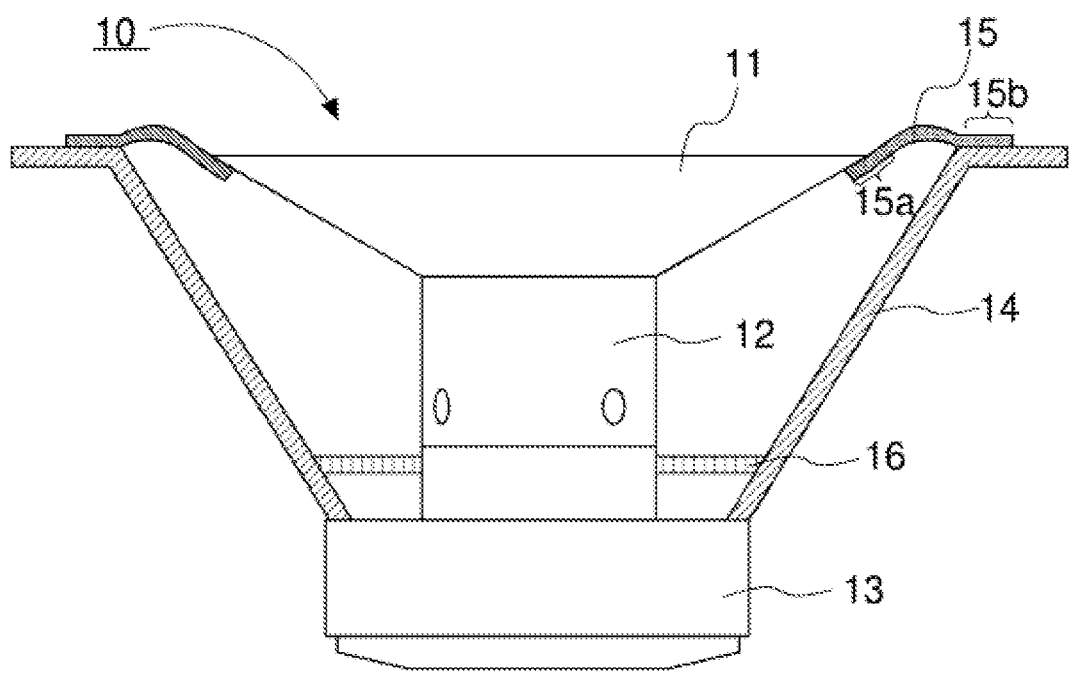
FIG. 1 is a schematic cross-sectional view of a speaker to an edge of which a composition for an acoustic member according to the present invention is applied.

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

An embodiment of the present invention is described below.

Composition for an Acoustic Member

A composition for an acoustic member according to the present invention includes a non-diene butyl rubber and a liquid polymer. A preferred embodiment will be described in detail below.

Non-Diene Butyl Rubber

Butyl rubber is a synthetic rubber having a low degree of unsaturation in which a small amount of isoprene is copolymerized with isobutylene, and is a rubber material having excellent environmental resistance. Types thereof include regular butyl rubber and halogenated butyl rubber. Butyl rubber is graded in accordance with the degree of unsaturation and halogen content. Typical halogenated butyl rubbers include chlorinated butyl rubber and brominated butyl rubber.

One type or grade of butyl rubber can be used alone, or a plurality of types or grades thereof may be used in combination.

Liquid Polymer

The present invention contains liquid polymer in order to modify the butyl rubber composition. The liquid polymer may be referred to as a modifier. Liquid polymer is also called liquid rubber, and is a polymer that is liquid (including a semi-solid state) at room temperature. There are various grades from low molecular weight to high molecular weight, but in the present invention, those having a weight-average molecular weight (Mw) of 1,000 or more and 120,000 or less are used. If the Mw is 1,000 or more, the crosslinked product (sometimes referred to as the first crosslinked product) obtained from the composition for an acoustic member according to the present invention does not become softer than necessary, and does not become sticky. If the Mw is 120,000 or less, the liquid polymer can be uniformly dispersed in the composition, and a homogeneous first crosslinked product can be obtained. The Mw of the liquid polymer is preferably 2,000 or more.

Examples of the liquid polymer include polybutene, polyisobutylene, polyisoprene, and polybutadiene. In particular, in the present invention, the liquid polymer is preferably polyisobutylene having an isobutylene unit, which is a structural unit of butyl rubber. In addition, even liquid polymers having different structural units can be used as long as they have excellent compatibility with butyl rubber and do not form a sea-island structure in the molded crosslinked rubber product. Thus, in the illustrated embodiment, the molded crosslinked rubber product (e.g., the crosslinked product) is free of a sea-island structure made of a resin material. A solubility parameter (SP value) can be used as an index at this time, and if it is within ±0.5 with respect to the SP value (7.3 to 8.1) of butyl rubber, it can be said that the compatibility is excellent. Polyisobutylene is also within this SP value range. Even if the SP value described above is not satisfied when used alone, if the above-described SP value can be satisfied by mixing, it could be used. Therefore, one type of liquid polymer can be used alone or two or more types may be used in combination. When a plurality of liquid polymers are mixed, the molecular weight (Mw) as a mixture is employed as the molecular weight, but it is preferable to combine those having a similar Mw.

The "SP value" in the present invention is a value as a Hildebrand solubility parameter. Values disclosed as theoretical values may be employed as the SP value. It can also be obtained by means of a known calculation method. Furthermore, it can actually be measured by means of the cloud-point titration method.

In addition, the weight-average molecular weight (Mw) is a standard polystyrene-equivalent value measured by means of gel permeation chromatography (GPC).

Compounding Ratio

An optimal compounding ratio of the non-diene butyl rubber and the liquid polymer in the composition for an acoustic member according to the present invention can be appropriately selected within a range satisfying characteristics suitable for the acoustic member. For example, relative to 100 parts by mass of the butyl rubber, preferably 1 to 100 parts by mass, and more preferably 10 to 60 parts by mass of the liquid polymer can be blended.

Other Components

Other than the non-diene butyl rubber and liquid polymer, a vulcanizing agent for crosslinking the rubber composition, a vulcanization accelerator (vulcanization aid), a filler, or a known additive in the art, such as a processing aid, can be appropriately added to the composition for an acoustic member according to the present invention as long as the effects of the present invention are not impaired. Additionally, other rubber (elastomer) components and resin components may be added as long as the effects of the present invention are not impaired. However, it is preferable that any of such rubber or resin components be applied within a range that does not form a sea-island structure.

Among the foregoing, the hardness of the obtained crosslinked product can be increased by adding a filler. The filler is not particularly limited, and examples thereof include carbon black, silica, calcium carbonate, talc, clay, and titanium white. These may be used individually, or two or more types may be used in combination.

The vulcanizing agent (including a vulcanization accelerator) is not particularly limited, and examples thereof include sulfur, a sulfur-based vulcanizing agent such as tetraalkylthiuram disulfide, a metal oxide, an organic peroxide, and a resin compound, which may be used alone or in combination of two or more. In particular, a metal oxide is preferably included together with sulfur. The metal oxide is not particularly limited, and examples thereof include zinc oxide and magnesium oxide, of which zinc oxide is preferable.

The amount of vulcanizing agent to be blended is preferably 1 part by mass or more and 30 parts by mass or less, and more preferably 5 parts by mass or more and 15 parts by mass or less with respect to 100 parts by mass of butyl rubber.

The processing aid is not particularly limited as long as it is a material for improving processability, and examples thereof include compounds having a fatty acid skeleton such as stearic acid and amines. These may be used individually, or two or more types may be used in combination.

Method of Preparing the Composition for an Acoustic Member

The method of preparing the composition for an acoustic member according to the present invention is not particularly limited, and a conventionally well-known method can be employed; first, each material component is kneaded with a known kneader until sufficiently uniform to obtain an unvulcanized composition. Next, the unvulcanized composition can be molded into a desired shape while being heated and vulcanized by means of compression press molding, transfer molding, or the like.

Physical Characteristics of the Crosslinked Product

The crosslinked product (first crosslinked product) of the composition for an acoustic member according to the present invention has an internal loss (tan δ) in a dynamic viscoelasticity measurement, when measured under the conditions of 20° C., 0.1% dynamic strain, and 1 Hz frequency, which is increased by 120% or more as compared with a second crosslinked product formed by removing the liquid polymer from said composition, and the A hardness of the first crosslinked product according to JIS K6253 is 60% or more and 90% or less of the A hardness of the second crosslinked product.

The second crosslinked product, which is a crosslinked product of a rubber composition that does not contain a liquid polymer, is a crosslinked product formed from a composition obtained by removing the liquid polymer from the composition for an acoustic member according to the present invention, and is a crosslinked product of a so-called non-modified butyl rubber composition, which does not contain any softening agent, such as process oil, or a liquid polymer within or outside the specified range of the present invention. Assuming that the tan δ value of the second crosslinked product measured under the above-described conditions is 100%, vibration absorption suitable for an acoustic member can be obtained if the tan δ value of the crosslinked product according to the present invention is 120% or more.

The tan δ value is measured in accordance with, for example, JIS K6394 (Dynamic Property Test Method for Vulcanized Rubber and Thermoplastic Rubber/Small Test Apparatus), and is the ration (E"/E') of the loss modulus of longitudinal elasticity (E": Pa) and the storage modulus of longitudinal elasticity (E': Pa). The effect of reducing vibration increases as the value of tan δ increases.

In addition, if the A hardness of the first crosslinked product is 60% or more of the A hardness of the second crosslinked product, the product will not become too soft and the obtained product will not be sticky (tackiness), thereby facilitating handling. If the A hardness of the first crosslinked product is 90% or less of the A hardness of the second crosslinked product, the effect of adding the liquid polymer is sufficiently exhibited, and an appropriate softness can be imparted to the product. Specifically, it is preferable to adjust the components and amounts of the composition such that the A hardness is around 50 (about 45 to 55, more preferably 47 to 52). The A hardness here indicates the initial hardness measured immediately after production.

Additionally, it is preferable that the rate of change (absolute value) of the A hardness of the first crosslinked product before and after holding at 110° C. for 300 hours is less than 10%. If the rate of change is less than 10%, there is almost no change in the usage environment of the actual product, and excellent performance can be maintained for a long period of time. The rate of change is more preferably 5% or less, and optimally 2% or less. It is particularly preferred that it does not change substantially (0%).

Acoustic Member

The composition for an acoustic member according to the present invention is used, particularly in an acoustic member having a vibrating member, as a vibration damping material for controlling the vibration of the vibrating member, A typical example is a speaker member such as an edge that connects the diaphragm of the speaker to the frame. Other than a speaker member, the composition can also be used for an acoustic member (for example, a microphone insulator) in which it is desirable to absorb/eliminate unnecessary vibration.

FIG. 1 is a cross-sectional view schematically showing the configuration of a speaker to which is applied an edge made of the composition for an acoustic member according to the present invention. The speaker 10 includes a diaphragm 11, a coil 12, and a magnet 13, which are attached to a speaker frame 14. The diaphragm 11 is attached to the speaker frame 14 by means of an edge (also referred to as surround) 15 according to the present invention. The edge 15 has a roll shape, as will be understood in the art. In a typical example, the edge 15 has a first end portion 15a attached to the diaphragm 11 and a second end portion 15b attached to the speaker frame 14, by means of any suitable type of glue, paste, adhesive, or fastener, or any suitable method as understood in the art. The coil 12 is sometimes referred to as a voice coil and may be attached to the speaker frame 14 by a flexible suspension 16. The flexible suspension 16 is commonly referred to as a "spider" and is made of a flexible material such as corrugated fabric or any suitable method as understood in the art. Similar to a conventional coil, the coil 12 has a wire winding (not shown) wound around a portion of the outer side of the coil and is connected to, for example, a terminal board (not shown) as understood in the art. The magnet 13 is attached to the speaker frame 14 by any suitable type of attachment structure as understood in the art.

The size of the edge (thickness, length, etc.) is not particularly limited, and can be appropriately formed into an optimum size in accordance with the size and output power of the speaker.

By applying the composition for an acoustic member according to the present invention to the edge of a speaker, it is possible to realize excellent impulse response behavior, and to thereby provide a speaker that reproduces sounds having good resolution from high to low tones. In addition, since there is no oil bleed and the durability is excellent, it can be used for a long period of time without replacing the edge. Additionally, since butyl rubber has good temperature characteristics, it is not easily affected by the ambient temperature, and it is thereby possible to form a speaker capable of providing stable sound in various environments from cold regions to extremely hot regions.

Figure 2:
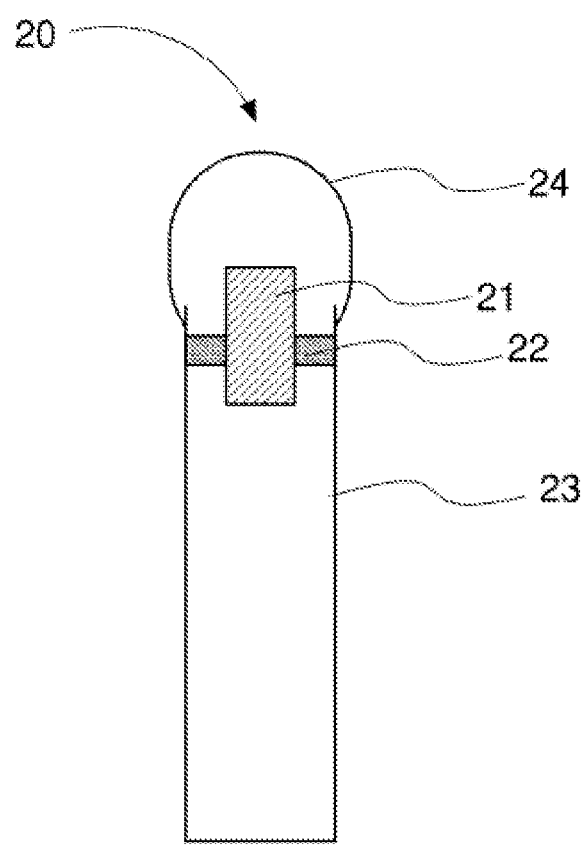
FIG. 2 is a schematic view of a handheld microphone to an insulator of which the composition for an acoustic member according to the present invention is applied.

FIG. 2 is a cross-sectional view schematically showing the configuration of a handheld microphone 20 to which is applied a sound-deadening member (insulator) made of the composition for an acoustic member according to the present invention. As shown in the figure, by disposing an insulator 22 made of the composition for an acoustic member according to the present invention at the portion where a microphone capsule 21 is attached to a body 23 corresponding to the grip, handling noise is no longer picked up by the microphone capsule and it becomes possible to collect sound with excellent sound quality. 24 is a windscreen that covers the microphone capsule 21.

Since there are differences in the required performance, material thickness, and the like, between a speaker edge and a handheld microphone insulator, it is preferable that the elastic characteristics and hardness are also respectively optimized.

Effects

According to the present invention, it is possible to provide a composition for an acoustic member that is suitable as an acoustic member, which secures flexibility and a moderately high internal loss, has excellent durability in which bleed-out of the internal additive, etc., does not occur, and that can maintain design hardness.

Additionally, by using the composition for an acoustic member according to the present invention, it becomes possible to provide an acoustic member having excellent durability and sound quality.

EXAMPLES

The present invention will be specifically described below with reference to examples, but the present invention is not limited to these examples, and may be appropriately modified by a person skilled in the art within the scope of the Claims.

Control Example 100 parts by mass of butyl rubber (manufactured by JSR, trade name "Butyl 268"), 50 parts by mass of carbon black (manufactured by Tokai Carbon Co., Ltd., trade name "SEAST SO (FEF)"), 5 parts by mass of zinc oxide (manufactured by Seido Chemical Industry CO., LTD, grade 2 zinc oxide), 2 parts by mass of stearic acid (manufactured by Nichiyu Co., Ltd.) as a processing aid, 1.5 parts by mass of sulfur (manufactured by Hosoi Chemical Co., Ltd.) as a vulcanizing agent, 1 part by mass of tetramethylthiuram disulfide (acronym TMTD, manufactured by Ouchi Shinko Kagaku Kogyo Co., Ltd., trade name NOCCELER-TT-P (TT)") as a vulcanization accelerator, and 1 part by mass of 2-mercaptobenzothiazole (acronym MBT, manufactured by Ouchi Shinko Kagaku Kogyo Co., Ltd., trade name NOCCELER-M-P (M)") were blended to prepare a control composition for manufacturing the second crosslinked product.

Examples 1-4

Comparative Examples 1-4

Each composition was prepared in accordance with the formulation shown in Table 1. As for the common rubber composition, the same materials as those in the control example were blended at the same composition ratio, and I to VII of Table I were used as modifiers. Details of I to VII are as follows.

I: Polybutene (manufactured by JXTG Nippon Oil & Energy Corporation, trade name "Nisseki Polybutene", grade LV-7, Mn=300)

II: Polybutene (manufactured by JXTG Nippon Oil & Energy Corporation, trade name "Nisseki Polybutene", grade HV-35, Mn=750)

III: Polybutene (manufactured by DEALIM Industrial, trade name "PB-2400")

IV: Polyisobutylene (manufactured by JXTG Nippon Oil & Energy Corporation, trade name "Tetrax", grade 6T)

V: Polyisobutylene (manufactured by Shandong Hongrui Petrochemical Co., Ltd., trade name "HDR-950J")

VI: Polybutadiene (manufactured by Nippon Soda Corporation, trade name "NISSO I-PB" brand B-3000. Mn=3200)

VII: Process oil (manufactured by Japan Sun Oil Company, Ltd, trade name "SUNTHENE 410")

at 160° C. for 30 minutes to thereby mold measurement samples (20 mm length, 5 mm width, and 2 mm thickness).

Measurement Conditions

In compliance with BS K6394, using a dynamic viscoelasticity measuring device (model number RSA-G2) manufactured by TA Instruments, elastic modulus E' (MPa) and tan δ were measured under the conditions of 20° C., dynamic strain of 0.1%, and frequency of 1 Hz, and the relative ratios when the control example was set to 100% are shown.

Environmental Test: A Hardness

Measured in accordance with JIS K6253.

In addition, a durability test was conducted in which the temperature was kept at 110° C. for 300 hours in a constant temperature bath for heat resistance testing. Table 2 shows the A hardness before the start of the test (initial), the relative ratio when the control example is 100%, the A hardness after the test, and the rate of change from the initial value.

Acoustic Panel Test

Using a speaker box of about 10 L in size, an edge molded by means of the following method was attached to the diaphragm of a 6.5-inch size speaker unit, and 10 panelists made subjective evaluations on a 10-point scale from −5 to +5, where the control example is assumed to be 0. The results are shown in Table 2. The evaluation criteria are as follows.

Attack

Using the attack of the sound in the speaker having the control example edge as a reference, the sound was evaluated in accordance with the point-addition/deduction method, in which 1 is added for a tight sound with a fast attack and 1 is subtracted for a loose sound with a slow attack.

Clarity

Based on the clarity of the speaker having the control example edge, 1 is added if the sound has a sense of depth and even soft sound can be recognized, and 1 is subtracted

TABLE 1

| Formulation No. | | | | Control | Example | | | | Comparative Example | | | |
|---|---|---|---|---|---|---|---|---|---|---|---|---|
| Raw material name | | Mw | SP value | Example | 1 | 2 | 3 | 4 | 1 | 2 | 3 | 4 |
| Common rubber composition | Butyl rubber | — | 7.7 | | | | | | 100 | | | |
| | Carbon | — | — | | | | | | 50 | | | |
| | Zinc Oxide | — | — | | | | | | 5 | | | |
| | Stearic acid | — | — | | | | | | 2 | | | |
| | Sulfur | — | — | | | | | | 1.5 | | | |
| Vulcanization accelerator | TMTD | — | — | | | | | | 1 | | | |
| | MBT | — | — | | | | | | 1 | | | |
| Modifier | Polybutene | I | 300 | 7.7 | — | | | | | 20 | | |
| | | II | 600 | 7.7 | — | | | | | | 20 | |
| | | III | 2500 | 7.7 | — | 20 | | | | | | |
| | Polyisobutylene | IV | 80000 | 7.7 | — | | 20 | 40 | | | | |
| | | V | 110000 | 7.7 | — | | | | 20 | | | |
| | Polybutadiene | VI | 3200 | 8.3 | — | | | | | | | 20 |
| | Process Oil | VII | — | — | — | | | | | | | | 20 |

(Unit is parts by mass)

The weight-average molecular weight (Mw) of the modifier was measured in accordance with GPC. Values in the literature were employed for the SP values.

The characteristics of each example were measured by means of the following methods. The results are shown in Table 2.

Identification of Elasticity

Manufacturing of Measurement Samples

The compositions having the formulations shown in Table 1 were kneaded at room temperature for about 15 minutes using a kneading roll for rubber, and vulcanized by heating if the sound has no sense of depth and soft sounds are buried and cannot be recognized, in accordance with the point-addition/deduction method.

Manufacturing Example of Edge (and Speaker)

A kneaded product, kneaded in the same manner as in the production of the measurement sample, was placed in a mold for an edge and molded at the same temperature and for the same amount of time. The obtained edge was attached to the diaphragm 11 of the speaker shown in FIG. 1, and further adhered to the frame 14 using a thermoplastic rubber solvent type adhesive.

TABLE 2

| | Elasticity characteristics | | Environmental test: A hardness | | | | Acoustic panel test | |
|---|---|---|---|---|---|---|---|---|
| | E' | tan δ | | Initial | | Rate of | | |
| | relative ratio | relative ratio | Initial | relative ratio | After test | change | Attack | Clarity |
| Control examples | 100% | 100% | 61 | 100% | 60 | −2% | 0 | 0 |
| Example 1 | 68% | 121% | 47 | 77% | 47 | 0% | 3 | 3 |
| Example 2 | 65% | 121% | 51 | 84% | 50 | −2% | 4 | 5 |
| Example 3 | 42% | 129% | 48 | 79% | 48 | 0% | 4 | 4 |
| Example 4 | 76% | 121% | 59 | 85% | 52 | 0% | 4 | 4 |
| Comparative Example 1 | 45% | 136% | 34 | 56% | 35 | 3% | 1 | −1 |
| Comparative Example 2 | 40% | 121% | 35 | 57% | 37 | 6% | 0 | −1 |
| Comparative example 3 | 104% | 171% | 64 | 105% | 85 | 33% | −2 | 1 |
| Comparative Example 4 | 102% | 100% | 61 | 100% | 65 | 7% | −1 | 1 |

In Comparative Examples 1 and 2, by using a low molecular weight polybutene having a Mw of less than 1,000, tan δ was improved but the A hardness was greatly reduced to around 35, and the surface of the molded rubber was sticky. Furthermore, in the acoustic panel test, in Comparative Examples 1 and 2, the result was inferior in clarity due to the decrease in the hardness of the rubber.

In Comparative Example 3, the molecular weight was within the specified range, but the difference in the SP values between polybutadiene and butyl rubber was larger than 0.5, and compatibility with butyl rubber was poor. Although tan δ was greatly improved with the introduction of a diene structure, the A hardness was higher than that of the control example, thus making it harder, and the hardness was further increased after the environmental test, with a rate of change exceeding 10%. Therefore, it can be determined that the long-term durability is inferior.

In Comparative Example 4, neither tan δ nor the initial A hardness was different from that of the control example, and the effect of the additive was not confirmed. The hardness increased slightly after the test, and the durability was inferior to that of the control example. In Comparative Examples 3 and 4, there was no improvement in flexibility, and in the acoustic panel test, the result for the attack was inferior.

On the other hand, in Examples 1 to 4, tan δ was improved while the initial hardness was significantly decreased, and in the acoustic panel test, in Examples 1 to 4, excellent results were obtained for both attack and clarity. In addition, the rate of change in the A hardness was equal to or better than that of the control example.

What is claimed is:

1. A composition for an acoustic member comprising:
   a non-diene butyl rubber; and
   a liquid polymer,
   an internal loss (tan δ) in a dynamic viscoelasticity measurement of a first crosslinked product of the composition measured under conditions of 20° C., 0.1% dynamic strain, and 1 Hz frequency being increased by 120% or more as compared with a second crosslinked product formed by removing the liquid polymer from the composition, and A hardness of the first crosslinked product according to JIS K6253 being 60% or more and 90% or less of A hardness of the second crosslinked product, and
   a rate of change of the A hardness of the first crosslinked product being less than 10% before and after holding at 110° C. for 300 hours.

2. A composition for an acoustic member comprising:
   a non-diene butyl rubber; and
   a liquid polymer having a molecular weight of 1,000 to 120,000,
   a difference in an SP value between the liquid polymer and the butyl rubber being within ±0.5, and
   a rate of change of A hardness according to JIS K6253 for a first crosslinked product of the composition being less than 10% before and after holding at 110° C. for 300 hours.

3. The composition for an acoustic member according to claim 2, wherein
   a crosslinked product of the composition is free of a sea-island structure made of a resin material.

4. The composition for an acoustic member according to claim 2, wherein
   1 to 100 parts by mass of the liquid polymer is included relative to 100 parts by mass of the butyl rubber.

5. The composition for an acoustic member according to claim 2, wherein
   the liquid polymer contains the same structural unit as the butyl rubber.

6. The composition for an acoustic member according to claim 2, wherein
   the composition further contains a vulcanizing agent and a filler.

7. An acoustic member obtained by crosslinking and molding the composition for an acoustic member according to claim 2.

8. The acoustic member according to claim 7, wherein the acoustic member is an edge of a speaker.

9. The acoustic member according to claim 7, wherein the acoustic member is an insulator that supports a microphone capsule of a handheld microphone.

* * * * *